3,520,541
GASKETED PIPE
Amir Rohani, % Teheran Regional Water Board,
P.O. Box 5, Teheran, Iran
Continuation of application Ser. No. 614,882, Feb. 9, 1967. This application Jan. 31, 1969, Ser. No. 798,250
Int. Cl. F16j *15/00, 15/26;* F16k *41/00*
U.S. Cl. 277—11                                      3 Claims

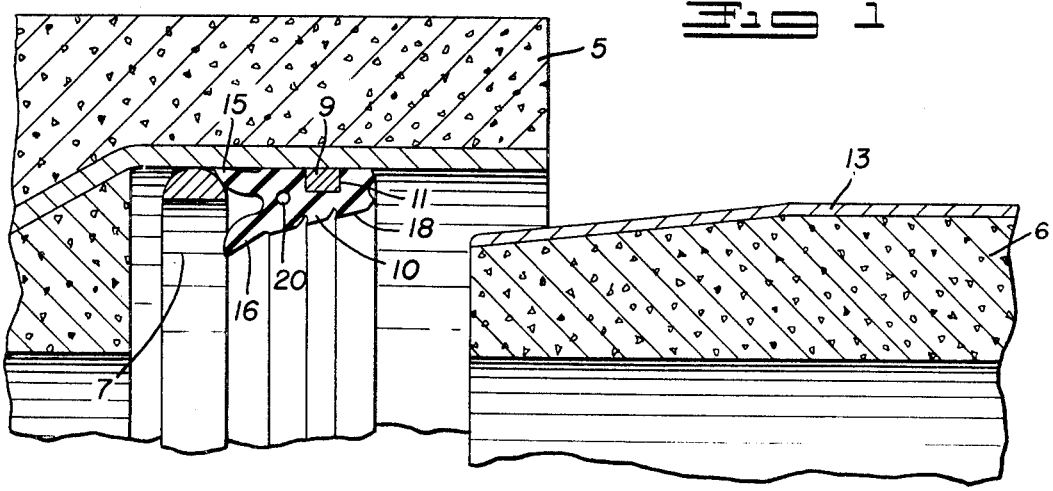
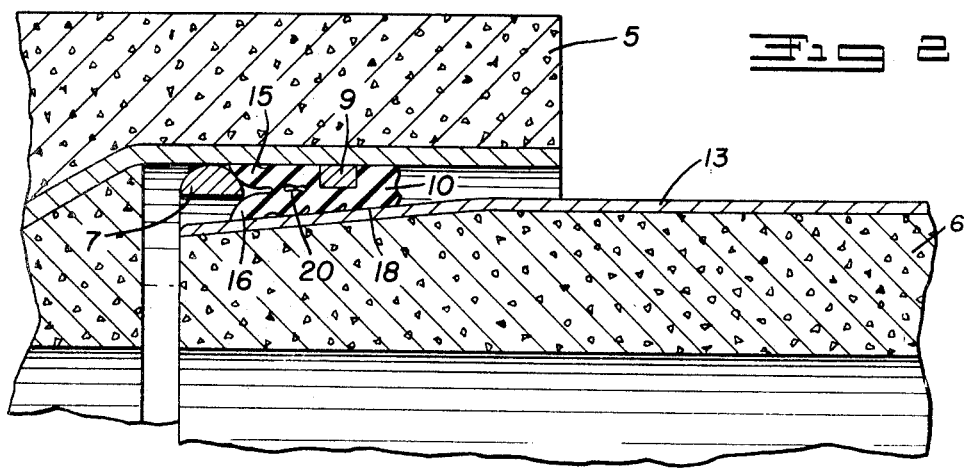
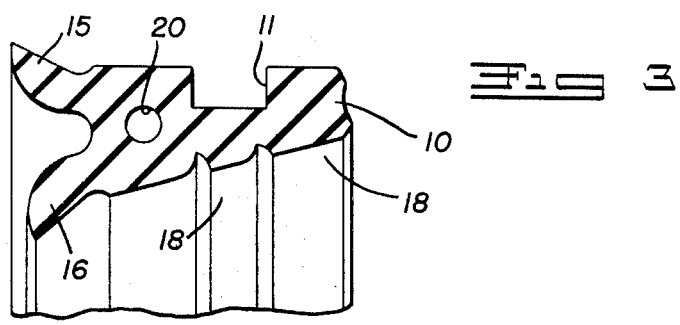

ABSTRACT OF THE DISCLOSURE

An anti-blowout ring is used with a clothespin-type gasket in the telescoping portions of two pipe sections to maintain the gasket in its position between the pipe sections.

---

This application is a continuation of application Ser. No. 614,882, filed Feb. 9, 1967, and now abandoned.

This invention relates to gasketed pipe. It comprises a plurality of pipe sections each made with a bell at one end and a spigot at the other. The spigot ends are telescoped into the bell ends and a gasket forms a tight seal between the sections at each joint formed in this manner. The gaskets are designed particularly for use in a pipe which conveys a gaseous or liquid fluid under pressure.

Annular clothespin-type gaskets are known for use with such fluids. Such gaskets are described in Nathan U.S. Pat. 3,173,694, for instance. The front end of such a gasket is divided to provide two circular lip portions which are spread by the fluid and pressed into sealing contact with the respective telescoped sections of the pipe. Although the pressure of the fluid forces these lips against the pipe sections, the gaskets are apt to move outward when under pressure.

According to this invention an anti-blowout ring is associated with such a gasket to maintain its position within a pipe joint. The gaskets may be perforated and the axial surfaces may be ribbed or grooved to insure sealing contact with the pipe sections as is customary. The length of the gaskets is not important. The rear ends may be rounded or squared or of any desired shape. Usually the anti-blowout ring fits into a groove in the outer axial surface of the pipe at any convenient location between the two ends of the gasket. The ring is of spring metal, usually a steel ring, and is somewhat shorter in length than the inner circumference of the bell, there being a gap of a short distance between the ends of the ring.

The invention will be further described in connection with the accompanying drawings, in which:

FIG. 1 is an exploded longitudinal section through two pipe sections, a gasket and the anti-blowout ring;

FIG. 2 is a similar view, but the pipe sections are assembled with the gasket between them; and FIG. 3 is a sectional view of a preferred gasket.

The pipes shown are concrete pipes with a metal lining in the bell 5 and a metal covering on the surface of the spigot 6. Other pipes may be used.

The bell 5 of the one pipe section is shown as having a positioning member 7 welded to its surface to assist in positioning the gasket in the bell. The positioning member is optional. The gasket tapers from its thicker end near the positioning member toward the opposite end. In locating the gasket the anti-blowout ring 9 may first be located by springing it outwardly against the inner surface of the bell of the pipe, and the gasket 10 is then fitted over this with the groove 11 conforming to the shape of the ring 9 and covering it. The ring may be an inch or two shorter than the circumference of the inner surface of the bell with a space between the two ends of the ring. Alternatively, the ring may first be positioned in the groove of the gasket, and the assembly of the gasket and ring may then be slid into the bell of the pipe. The ring is not welded to the bell but is slidable over its inner surface. Usually the gasket is slid into position against the member 7 before telescoping the spigot 13 into the pipe. However, the gasket may be positioned some little distance from the positioning member 7 when the spigot is telescoped into the bell and then as the pressure on the gasket increases it will be forced against the positioning member. The method by which the gasket and the anti-blowout ring are assembled between the pipe sections is optional.

In the final position as shown in FIG. 2, the gasket is squeezed between the two members. The lips 15 and 16 at the front of the gasket fit against the bell and spigot of the pipe. As fluid under pressure is introduced into the pipe, it presses itself between these lips and forces the lips outward into tight sealing contact with the pipe sections. As the gasket is moved away from the positioning member by the fluid pressure, the gasket material between the ring 9 and the spigot is squeezed by increasingly greater pressure so that the ring prevents the gasket from being blown out between the pipe sections under the internal pressure of the fluid conveyed through the pipe. The gasket shown has ribs 18 on its inner surface to assist in sealing the gasket against the pipe, but such ribs are not necessary. The opening 20 provides for cushioning the gasket when under pressure.

The ring 11 is rectangular in cross section, although this is not necessary. Generally, its thickness will be at least one-third of the radial thickness of the gasket where it is located. A rectangular cross section is better than a half round. The front surface of the ring may slant slightly backward to prevent the gasket from slipping over the ring. Thus the contour of the ring may be varied. It is designed for use with clothespin gaskets of different shapes. It is conceivable that the ring may be in contact with the spigot, in which case the gasket will be grooved on its inner axial surface, but the use of such a gasket assembly is complicated by the fact that the surface of the spigot 13 tapers toward its end.

The invention is covered in the claims which follow.

I claim:

1. The combination of two pipes with the spigot of the first pipe within the bell of the second pipe, with the space between the spigot and the bell tapering from a wider space at the end of the spigot to a narrower space away from the end of the spigot, an annular gasket in the space between the bell and the spigot one surface of which gasket tapers from a thicker end of the gasket in a wider portion of said space to a thinner end in a narrower portion of said space, an anti-blowout ring of constant length in a groove in the outer surface of the gasket with its outer surface exposed to the inner surface of the bell and with a depth of gasket material between said ring and the opposite face of the gasket, the anti-blowout ring being an open ring which is movable in said space toward the narrower end of said space but on such movement the gasket material is squeezed sufficiently between the bell and the spigot and between the anti-blowout ring and the inner surface of the spigot to prevent the gasket from being blown out of said space when subjected to fluid pressure within the pipes.

2. The combination of claim 1 in which a positioning member is fastened to the interior of the bell adjacent the smaller end of the spigot.

3. The combination of claim 1 in which the end of the gasket toward the smaller end of the spigot is formed with two separable lips to seal against the bell and spigot, respectively, when the gasket is subjected to pressure from within the pipe.

References Cited

UNITED STATES PATENTS

| | | |
|---|---|---|
| 2,314,386 | 3/1943 | Brend. |
| 2,362,125 | 11/1944 | Eves. |
| 2,722,438 | 11/1955 | Kennison. |
| 3,173,699 | 3/1965 | Nathan. |
| 3,199,899 | 8/1965 | Fujii _____ 277—162 X |

SAMUEL ROTHBERG, Primary Examiner

U.S. Cl. X.R.

277—162, 207; 285—379